Dec. 6, 1955

G. W. MERRITT 2,726,364

OVERLOAD-CONTROLLING MECHANISM FOR
ELECTRIC MOTOR-DRIVEN APPARATUS

Filed April 12, 1952

INVENTOR
G. W. Merritt

BY *M. S. McDowell*

ATTORNEY

Dec. 6, 1955

G. W. MERRITT 2,726,364

OVERLOAD-CONTROLLING MECHANISM FOR
ELECTRIC MOTOR-DRIVEN APPARATUS

Filed April 12, 1952

INVENTOR
G. W. Merritt

BY M. S. McDowell

ATTORNEY

United States Patent Office 2,726,364
Patented Dec. 6, 1955

2,726,364

OVERLOAD-CONTROLLING MECHANISM FOR ELECTRIC MOTOR-DRIVEN APPARATUS

Glenn W. Merritt, Bowerston, Ohio, assignor to The Nolan Company, Bowerston, Ohio, a corporation of Ohio Application April 12, 1952, Serial No. 282,038

7 Claims. (Cl. 318—475)

This invention relates to apparatus responsive to electric motor torque, having particular reference to an improved overload-controlling switch mechanism for protecting electric motors and apparatus driven thereby.

Many electric motors possess the characteristic of high starting torque. Motors having medium and normal torque commonly will exert up to 200% of their rated torque and, often, special high-torque motors will exert up to 300% of their rated torque when overloaded. This condition introduces a problem in the design and construction of various types of electric motor-driven machinery. One of the principal problems involved is that of designing machinery so that it will compensate sufficiently in adapting itself to high motor torque, but without introducing into the machinery unnecessary size, weight and cost in meeting the operating conditions created by high torque.

An object of the invention, therefore, is to provide an improved control in electric motor-driven apparatus which will permit of the utilization of high motor torque in apparatus employing conventional load and other design factors without injury to the apparatus.

Another object of the invention is to provide an improved automatically operating cut-out switch adapted to be so disposed in the operating circuit of an associated motor as to be responsive to given conditions of overload on a driving motor to arrest immediately the operation of said motor in response to excessive torque, thereby preventing injury to the motor or apparatus driven thereby.

Still another object of the invention is to provide an endless flexible drive means between an electric driving motor and the parts of a machine driven thereby, and wherein an improved overloading switch mechanism is provided for cutting out the motor when in the operation thereof the same attains a condition producing predetermined torque effort.

It is a further object of the invention to provide a mechanism of this character in which the operating circuit of a driving motor is formed with a cut-off switch which is adapted to be operated automatically by variations in position of the runs of an endless power-transmitting means, particularly apparatus in which the endless means is employed in transferring power from the armature of the motor, or a shaft coupled therewith, to a spaced load-carrying shaft employed in driving associated apparatus, whereby variations in the operating position of a run of said endless means are utilized to actuate mechanically the controlling switch and to open the associated motor circuit thereof when a predetermined torque condition exists on the part of said motor.

A still further object of the invention is to provide an electric motor drive of the character set forth in which the motor of the drive is positioned in a controlling circuit containing an automatically operated switch mechanism, the latter being responsive to predetermined conditions of motor overload to open said circuit in a manner relieving the motor and the apparatus driven thereby automatically of the over-loading condition, the aforesaid circuit being joined with a shunt circuit positioned to bypass under certain conditions the automatic switch mechanism, as by providing the shunt circuit with a manually operated switch by which the main circuit of the motor may be kept closed independently of the automatically operating switch mechanism, whereby to facilitate starting of the apparatus and to take advantage of the full starting of the apparatus and to take advantage of the full starting torque of the motor, but at the same time preventing injury to the mechanism driven by the motor through exercise of close manual attention occasioned by the actuation of the manual switch.

With these and other objects in view, which will appear as the description proceeds, the invention accordingly consists in the novel features of construction, combinations of elements, and arrangements of parts, hereinafter more fully described and set forth in the appended claims.

Figure 1:
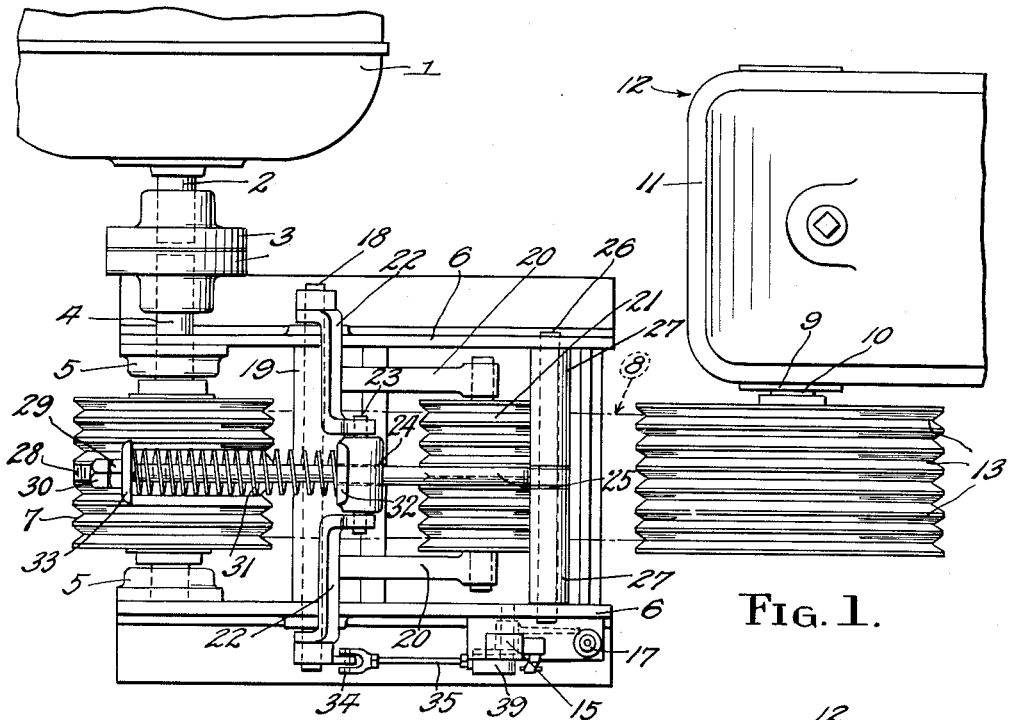
Fig. 1 is a top plan view of an electric motor-actuated endless belt drive formed with the overload-controlling switch mechanism and associated elements of the present invention.

Referring more particularly to the drawings, there has been indicated at 1 a standard electric motor. In this instance, the armature shaft 2 of the motor is coupled as at 3 with a longitudinally aligned drive shaft 4, the latter being mounted for rotation in spaced bearings 5 provided in connection with a stationary drive frame 6. Between the bearings 5, the drive shaft has fixed thereto for rotation a belt wheel 7. The latter is formed with a plurality of annular grooves adapted to receive a plurality of endless belts 8, each of which being substantially V-shaped in transverse cross section. It will be understood, however that other types of endless drives may be used.

A driven shaft 10, projecting from the casing 11 of a speed-reducing mechanism 12, is arranged in parallelism with the drive shaft 4, and carries in this instance a multiple-groove belt wheel 13, which is arranged in registry with the belt wheel 7, and around which passes endless V-belts 8. By this mechanism, power derived from the motor 1 is employed to drive the parts of the speed-reducing mechanism 12, an endless V-belt power-transmitting drive being utilized, as is common in a large number of machines or devices, although I do not limit the present invention thereto, reserving the right to employ all endless and flexible power-transmitting means now available in the field of machine design.

Figure 6:
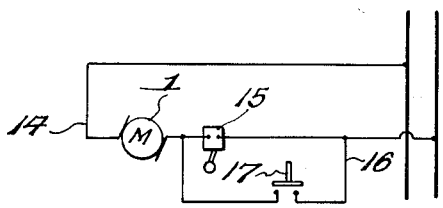
Fig. 6 is a diagrammatic view of the motor circuit and the associated and automatic and manually operated switches for governing the operation of the motor positioned in the circuit.

As shown in Fig. 6, the motor 1 is arranged in a main circuit 14. Positioned in this circuit is an overload switch 15, which is adapted to be automatically operated to open the circuit 14 when the motor 1 exerts predetermined torque effort. This is usually due to the application of high working loads to the speed-reducing mechanism 12, or other apparatus driven by the motor. The automatically operating overload switch 15 is by-passed by a shunt circuit shown at 16, in which is provided a normally open manually operated switch 17.

When the motor is first started, as will be hereinafter more fully explained, the apparatus is controlled by the manual switch 17, since at this stage the overload switch 15 will be open and the main motor circuit therethrough interrupted by the torque effect exerted on the belt 8. With the manual control provided by the switch 17, the operator of the apparatus may observe closely and at first hand how the apparatus is working. If, as a result of excessive motor torque, an objectionable condition is created or found to exist in the operation of the apparatus, the condition may be at once arrested by releasing the switch 17 so that the main motor circuit 14 will be opened and the motor thereby deenergized.

In governing the operation of the automatic overload switch 15, the frame 6 of the drive mechanism includes a horizontally extending rock shaft 18. Projecting from a sleeve 19, which surrounds the rock shaft 18 and rotates in unison therewith, are spaced arms, shown at 20. The outer ends of these arms carry V-grooved guide pulleys 21, which engage with the upper runs $a$ of the belts 8.

Connected with the outer ends of the rock shaft 18 for oscillation in unison therewith is a pair of yoke-shaped arms 22. The upper ends of these arms receive trunnions 23 which project horizontally from the ends of a rockable guide 24, the latter being formed with a central opening in which is slidably positioned the intermediate portion of the shank of an eye bolt shown at 25. The eye end of this bolt is pivotally mounted for turning movement on a stud 26, the latter being carried by the frame 6. Spacing sleeves, shown at 27, are disposed around the stud 26 between the eye of the bolt 25 and the sides of the frames 6.

The forward end of the bolt 25 is threaded as at 28 for the reception of an adjusting nut 29 and a lock nut 30. A coil spring 31 surrounds the bolt 25, and is positioned so that one end of the spring occupies a seat 32 formed in the guide member 24, while the opposite end of the spring engages with a washer 33 maintained in contact with the adjusting nut 29.

Figure 2:
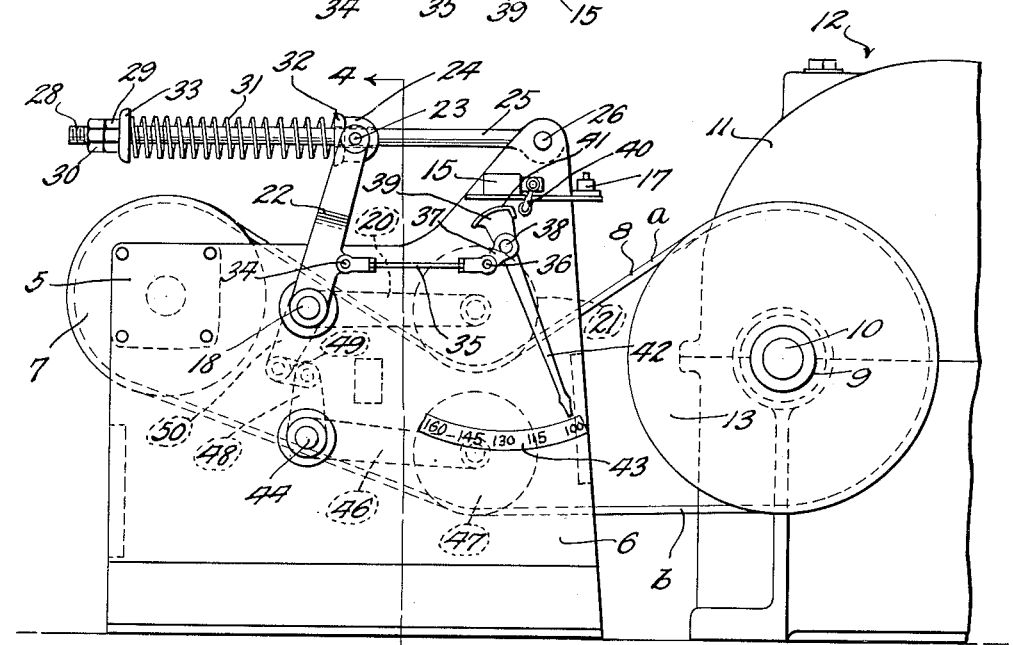
Fig. 2 is a side elevational view of the structure illustrated in Fig. 1.
Figure 3:
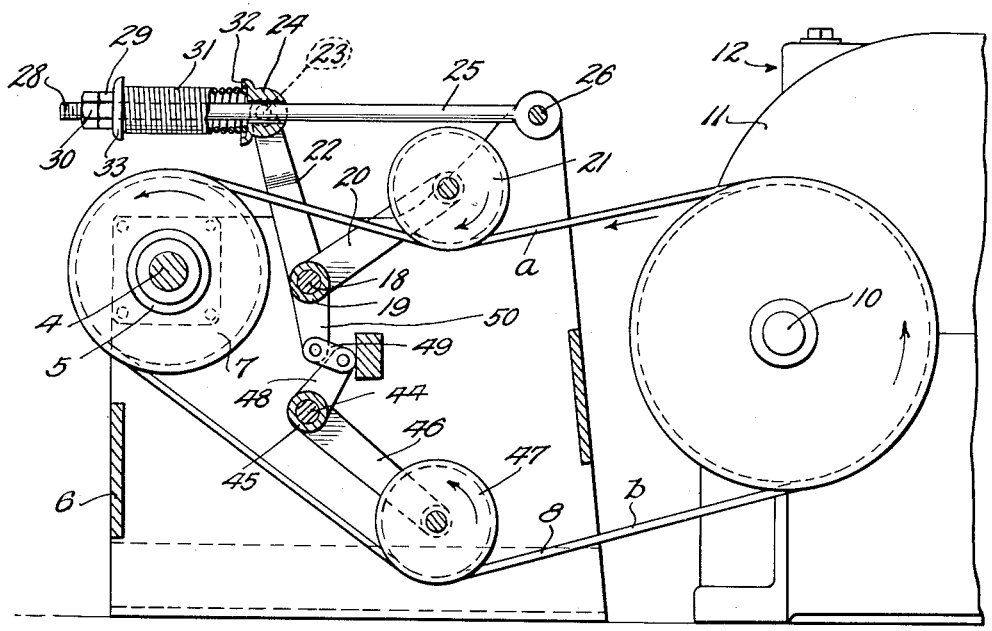
Fig. 3 is a vertical longitudinal sectional view taken through the mechanism and disclosing the position of the switch-actuating parts when the associated motor is operating under high torque conditions.
Figure 4:
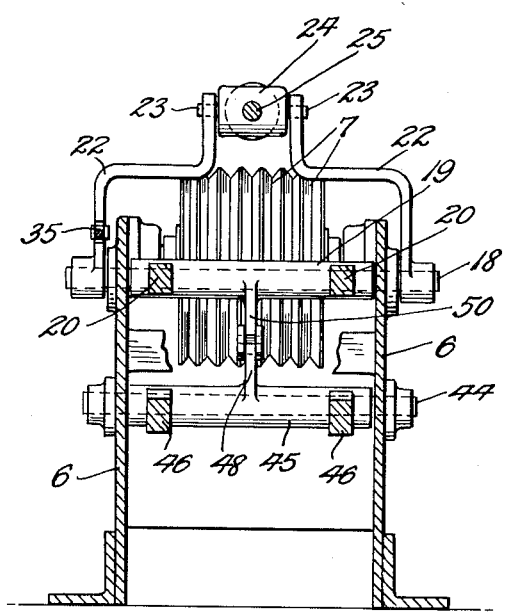
Fig. 4 is a vertical transverse sectional view taken on the plane indicated by the line 4—4 of Fig. 2.
Figure 5:
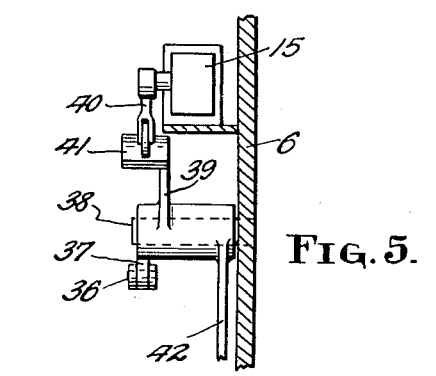
Fig. 5 is an end elevational view of the cutout switch and its operating cams.

When the drive is functioning normally, the belts 8 occupy the operating positions disclosed in Fig. 2. However, as the torque of the motor 1 increases the pull on the upper runs $a$ of the belts, and the resistance offered by the belt wheels 13 as a result of applied load, produces component forces in which the guide pulleys 21 are elevated, for example, from the positions shown in Fig. 2 to those illustrated in Fig. 3. This elevation of the guide pulleys 21 results in rocking the shaft 18 so that the yoke arms 22 are oscillated in a forward direction, this being accomplished in a manner moving the guide members 24 with them and against the resistance to such movement offered by the compression of the coil springs 31.

One of the yoke arms 22 has pivotally connected therewith, as at 34, one end of a link 35. The opposite end of this link is pivoted as at 36 to a crank arm 37 carried by a stud shaft 38. Movable with the crank arm 37 is a cam 39. Normally this cam is disposed in spaced relation from a pivoted actuating arm 40 provided on the automatic cutout switch 15. Under normal motor torque the cam 39 is spaced from the arm 40, as shown in Fig. 2, so that the switch 15, which is of the self-closing type, will occupy a position closing the main circuit 14 of the motor 1. However, when the motor torque increases to a point in which the safety factor of the apparatus driven by the motor is involved, the belt movement described produces oscillation of the yoke arms 22, imparting movement to the cam 39 in a direction causing the peripheral edge 41 thereof to contact a roller on the arm 40. This opens the switch 15 automatically, thereby discontinuing the operation of the motor 1. If desired, the cam 39 may be combined with an indicator or pointer 42 which is movable over a graduated surface 43 of the frame 6 for the purpose of disclosing visually the approximate torque effort of the motor 1.

Disposed in parallelism with the rock shaft 18 and arranged below the same within the frame 6 is a second rock shaft 44. Carried by this rock shaft is a sleeve 45 formed with the spaced arms indicated at 46. These arms at their outer or free ends carry a lower guide pulley 47 which is maintained in contact with the lower runs $b$ of the belts 8. The sleeve 45 carries an upstanding arm 48 centrally thereof which is linked as at 49 to the lower end of a complemental arm 50 depending from the upper sleeve 19. In this manner, the upper and lower guide pulleys function together to maintain a constant tension on the drive belts, the pulleys moving in opposed relation.

An accepted practice in machine design is to provide means to take advantage of the ability of an electric drive motor to exert 200% to 300% of its rated torque for starting loads. In accordance with the present invention, I propose that the motor be started by push button or manual control, with the push-button switch by-passing the safety limit switch of the apparatus. In other words, as long as the machine operator maintains the push-button switch in its position of circuit closure, the machine will function while the motor is exerting up to 300% of its rated torque. The value of this design resides in the fact that while the machine operator is holding the manual switch closed, he can avail himself, because of his proximity to the apparatus, of his senses of hearing and sight. Thus, the manual switch may be immediately opened and the operation of the motor 1 arrested if there is any jamming, or other deleterious action, of the apparatus driven by the motor. Ordinary protective devices now commonly employed in such motor controls are in many instances responsive to motor heat, and normally consume two to three seconds before this heat becomes effective in operating the associated thermally-responsive overload-preventing motor switch.

It is after the operator has started the machine that the automatic protection afforded by the present invention is especially effective. I can set my improved torque control device so that it will cut out the motor any where from 100 to 200 per cent of its normal torque capacity. Normally I would set it at 150 per cent of said capacity, so that the motor would only come up in torque to the factor of one and one-half (1½) which is used in the design of various parts of the machine driven by the motor.

It will be noted that the upper idler pulley 21 presses down on the top strands of the V-belts through the action of the compression spring 31. The lower idler pulley, indicated at 47, being connected by toggles to the arm carrying the upper pulleys 21, moves in an opposite direction to said upper pulley, so that the belt is maintained in a constant tension at all times. In the case of an overload, the pull on the upper strands $a$ of the belts will cause the upper pulley 21 to move upwardly, compressing the spring 31, and this movement will operate the cam 39, which will translate to open the limit switch 15. The indicator hand or pointer 42 may be mounted on this cam shaft in association with the dial 43 in substantially the manner shown. My improved torque control device may be actively set to provide predetermined operation or may be set by reading the ampere consumption of the motor under a stalled condition.

While I have set forth and described in detail the preferred embodiment of the present invention, nevertheless it will be understood that the invention is subject to certain variation or modification without departing necessarily from the spirit of the invention or the scope of the following claims.

I claim:

1. In mechanism of the character described, a supporting frame, upper and lower sets of pivoted lever arms carried by said frame, guide pulleys carried by the outer ends of said lever arms, said pulleys having constant engagement with the opposite driving and return runs of an associated endless belt of a power transmission, toggle means uniting the inner ends of said arms in a manner causing said arms to swing in opposed relation to each other, spring means coacting with said lever arms to maintain said guide pulleys in positive slack-removing and tensioning engagement with the opposite runs of said belt throughout all operating positions of the belt runs in their response to different working loads thereon, a switch controlling an operating circuit for an electric motor used in driving said belt, said switch including an actuating member, and means linking one of said lever arms with the switch actuating member to produce operation of the switch in opening the associated motor circuit when said last-named arm is moved to a predetermined degree against the resistance of said spring means through the operation of said belt.

2. In mechanism of the character described, a supporting frame, upper and lower sets of pivoted lever arms carried by said frame, guide pulleys carried by the outer ends of said lever arms, said pulleys having constant engagement with the opposite driving and return runs of an associated endless belt of a power transmission, toggle means uniting the inner ends of said arms in a manner causing said arms to swing in opposed relation to each other, spring means coacting with said lever arms to maintain said guide pulleys in positive slack-removing and tensioning engagement with the opposite runs of said belt throughout all operating positions of the belt runs in their response to different working loads thereon, an automatic switch controlling an operating circuit for an electric motor used in driving said belt, said switch including an actuating member, means linking one of said lever arms with the switch actuating member to produce operation of the switch in opening the associated motor circuit when said last-named arm is moved to a predetermined degree against the resistance of said spring means through the operation of said belt, and a shunt circuit carried by said motor circuit for by-passing said switch, said shunt circuit including a normally open manually operated switch for causing operation of said motor independently of the automatic switch.

3. Switch-operating apparatus for electric motor-actuated endless belt drives, comprising: a supporting frame; oscillatory, oppositely acting lever arms pivotally mounted on said frame; means linking said arms for simultaneous swinging movement in opposed directions; belt-engaging guide devices carried by the outer ends of said lever arms for engagement with driving and return runs of an associated endless belt; spring means cooperative with said arms and rocking the same normally in directions in which the guide devices thereon are moved toward each other and resisting yieldably belt-applied forces tending to rock said arms in directions separating said devices; and means operated by said arms when the same assume predetermined positions of relative separation in the response thereof to shortening of the effective length of the driving run of the belt to open automatically the energizing circuit of an associated belt-driving motor, said oppositely movable lever arms serving to maintain the return run of said belt taut at all times irrespective of increases in the effective length thereof caused by shortening of the effective length of the driving run of the belt in its response to an increased power load.

4. Switch-operating apparatus for electric motor-driven belt transmission as defined in and by claim 3, and wherein a manual switch is provided for producing higher power loading on said belt than can be obtained by the automatic belt-responsive control, said lever arms serving to maintain tautness in the belt runs under both automatic and manual regulation of the operating motor.

5. In mechanism of the type in which an endless belt having spaced driving and return runs is employed in transmitting power from an electric motor to a driven appliance, and wherein a switch-controlled energizing circuit is provided for the motor; a supporting frame; lever arms pivotally mounted on said frame; means linking said arms for simultaneous swinging movement in opposite directions; belt-engaging guides carried by said arms disposed in engagement with the driving and return runs of an associated belt; spring means cooperative with said arms and serving to maintain the guides of said arms in constant engagement with said belt runs to hold the latter under tension and free from slack under all conditions of motor operation; and means operated by said arms when the same assume predetermined positions of relative separation to open automatically the energizing circuit of said motor.

6. Overload-controlling mechanism for electric motor-driven endless belt drives as defined in and by claim 5, and wherein a manual switch is provided in the energizing circuit of the operating motor for providing operation of the latter under conditions of higher torque development than that obtained by said automatic means, the mounting of said lever arms on said frame and the operation of the associated spring means being such as to maintain the driving and return runs of the belt taut under both automatic and manual control of said motor.

7. In overload-controlling mechanism for electric motor-driven endless belt drives; a supporting frame; bell crank lever devices pivotally mounted on said frame in relatively spaced order; belt-engaging guides carried by the outer ends of said devices, one of said guides being formed for engagement with the outer surface of the driving run of an endless power-driven belt passing over spaced wheels, the other of said guides being engaged with the inner surface of the return run of said belt; means pivotally uniting said lever devices for coordinated movement in unison and to produce reverse rocking movement thereof in response to belt-applied forces; and means cooperative with said lever devices to maintain the guides thereof in constant tension-applying engagement with the opposing belt runs.

References Cited in the file of this patent

UNITED STATES PATENTS

| | | |
|---|---|---|
| 1,949,119 | Gibbs | Feb. 27, 1934 |
| 2,068,745 | Hall | Jan. 26, 1937 |
| 2,624,032 | Hennessy | Dec. 30, 1952 |